(12) United States Patent
Lindell et al.

(10) Patent No.: US 6,655,710 B2
(45) Date of Patent: Dec. 2, 2003

(54) SYSTEM FOR DETECTING TRAILER INSTABILITY

(75) Inventors: Heather M. Lindell, Oxford, MI (US); Paul A. Grougan, Novi, MI (US)

(73) Assignee: General Motors Corporation, Detroit, MI (US)

(*) Notice: Subject to any disclaimer, the term of this patent is extended or adjusted under 35 U.S.C. 154(b) by 89 days.

(21) Appl. No.: 10/084,612

(22) Filed: Feb. 27, 2002

(65) Prior Publication Data

US 2003/0160428 A1 Aug. 28, 2003

(51) Int. Cl.[7] .............................................. B62D 12/00
(52) U.S. Cl. ....................................... 280/419; 180/412
(58) Field of Search ..................... 180/408, 412–415, 180/421, 422; 280/419, 442

(56) References Cited

U.S. PATENT DOCUMENTS 6,494,476 B2 * 12/2002 Masters et al. ............. 280/426

* cited by examiner

*Primary Examiner*—Kevin Hurley
*Assistant Examiner*—L. Lum
(74) *Attorney, Agent, or Firm*—Christopher DeVries

(57) ABSTRACT

A vehicle steering mechanism to compensate for instabilities including a vehicle frame, a front axle coupled to the vehicle frame, the front axle further coupled to two front wheels, a rear axle coupled to the vehicle frame, the rear axle further coupled to two rear wheels, an actuator for changing the direction and angle of the two rear wheels, a trailer hitch coupled to the frame, at least one sensor for measuring instability in the trailer hitch, a controller processing the measured instability, and where the controller controls the actuator and the direction and angle of the two rear wheels to compensate for the measured instability.

15 Claims, 4 Drawing Sheets

SYSTEM FOR DETECTING TRAILER INSTABILITY

TECHNICAL FIELD

The present invention relates generally to vehicle towed trailers. More specifically, the present invention relates to a method and apparatus to detect trailer instability in a vehicle-trailer configuration or arrangement and compensate for the trailer instability.

BACKGROUND OF THE INVENTION

Towing trailers behind a vehicle is a common practice for today's vehicle owners. Typically, a vehicle such as a truck will be equipped with a trailer hitch that may be coupled to numerous types of devices such as a trailer. The vehicle will have to provide sufficient engine torque and directional stability to pull the trailer. A trailer may become unstable when it is improperly loaded or there are tire pressure differences in the trailer wheels. Improper trailer loading generally occurs when there is a failure to equally distribute the trailer's cargo over the left and right sides of the trailer. Once the tow vehicle and trailer are in motion, an improperly loaded trailer may become unstable and generate oscillations that may propagate to the vehicle towing the trailer. Furthermore, other environmental factors may induce instability in a tow vehicle and trailer arrangement including crosswinds, road conditions, driving maneuvers, and other similar conditions.

Presently, trucks may include four-wheel steering or steering of all four tires of a vehicle. The steering of a rear axle or wheels is accomplished through the use of an electric motor driving a rear steering rack. Through electronic controls from a controller in the vehicle, the electric motor controlling the rear steering rack may turn the direction and angle of the rear wheel tires as a function of the front wheel steering or as functions of other environmental factors. Four-wheel steering may be used to stabilize a vehicle affected by numerous driving conditions.

SUMMARY OF THE INVENTION

The present invention includes a method and apparatus to compensate for instabilities generated by a trailer towed by a vehicle. The present invention utilizes sensors to detect the onset of instabilities in a vehicle and trailer tow arrangement such as oscillations and corrects these instabilities using the four-wheel steering system on a vehicle. The corrections by the four-wheel steering system may compensate for the disturbances in their infancy by detecting the disturbances before they affect the performance of the vehicle-trailer tow arrangement.

By effectively detecting the articulation angle of the trailer, algorithms may characterize the oscillation. If the oscillation is characterized as presenting an unstable driving condition, four-wheel steering can be utilized to cancel the onset of trailer instability. Cancellation of trailer oscillations will prevent the oscillations from affecting vehicle yaw and ride quality as well as preventing potentially dangerous driving situations.

The sensors used by the present invention include, but are not limited to, strain gauges, liner potentiometers, linear encoders, limit switches, infrared detectors, ultrasonic sensors, and optical cameras. The sensors used in the present invention initiate compensation for a trailer load imbalance by detecting an oscillation in the trailer dynamics. An important function of the invention is to detect the trailer instability at the onset of the trailer oscillations.

Unstable trailering conditions generally occur when three or four oscillations with a delta of zero to five degrees occur in less than two seconds. By detecting the trailer angle deltas, algorithms will be utilized to characterize the oscillation and command the appropriate four-wheel steering actuation. The specific algorithms employed may be vehicle specific and are not limited by the described criteria. The characteristics of trailer instability are dependant on the specific tow vehicle and trailer combination.

DESCRIPTION OF THE PREFERRED EMBODIMENT

Figure 1:
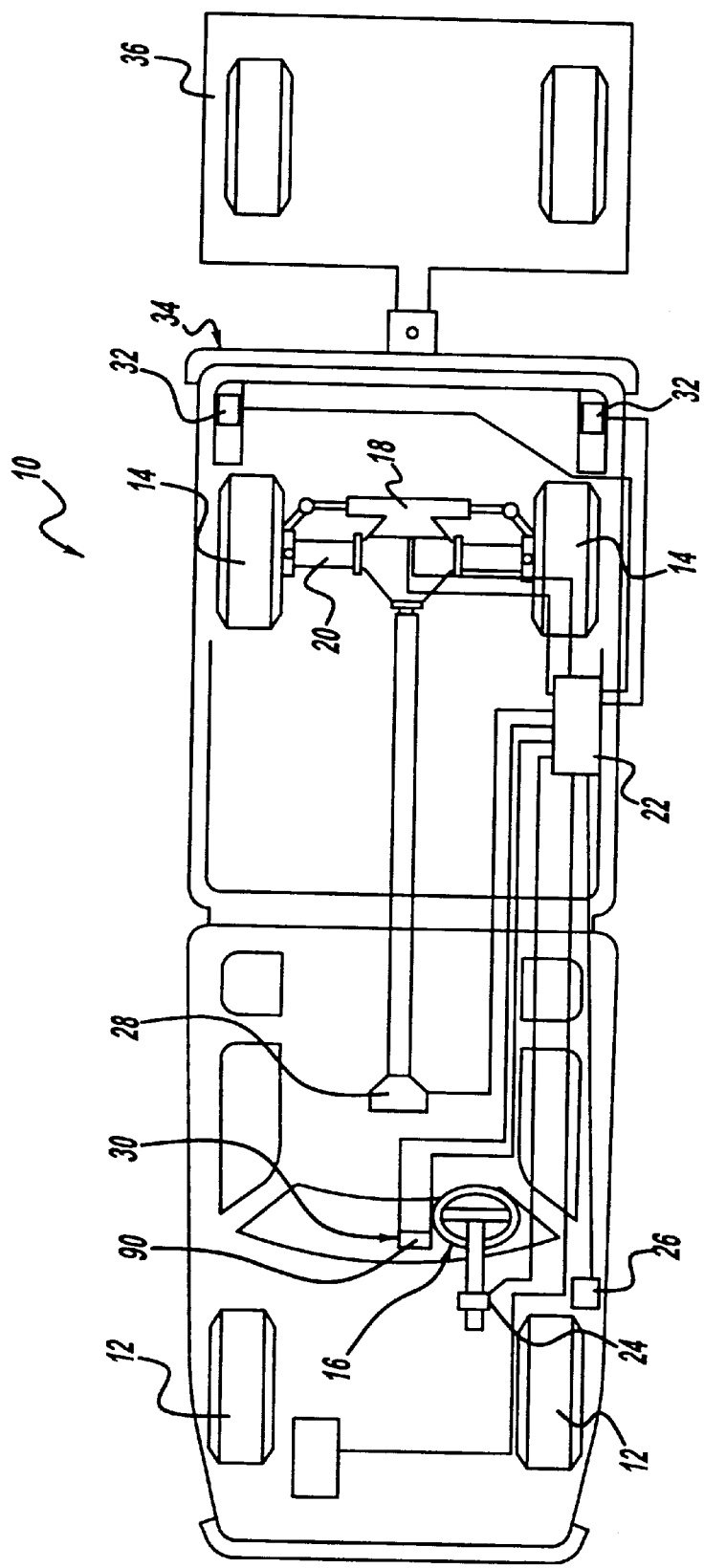
FIG. 1 is a diagrammatic drawing of a four-wheel steering system in a vehicle.

FIG. 1 is a diagrammatic drawing of a vehicle 10 equipped with a four-wheel steering system. The vehicle 10 includes front tires 12 and rear tires 14. The front tires 12 are conventionally controlled by a steering wheel 16. An actuator assembly 18 is coupled to the rear axle 20 of the vehicle 10 to control the direction of the rear tires 14 as a function of the front tires 14 or other variables. The rear axle is preferably a solid or "live" axle, as is known in the art. A controller 22, such as a chassis controller, receives inputs from a steering wheel position sensor 24, a yaw sensor 26, a vehicle speed sensor 28, and a mode selector 30. The mode selector 30 allows the driver to select one of three modes through a push-button control panel on the four-wheel steer vehicle's dash. The three options include, but are not limited to, normal two-wheel steer mode (2WS), four-wheel steer mode (4WS), and four-wheel steer tow mode (4WS-TOW). Four-wheel steering mode will improve trailering stability; however, 4WS-TOW mode decreases the amount of commanded steer to the rear wheels at low speeds and increases the amount of steer commanded to the rear wheels at high speeds. The controller 22 further receives position feedback information from the actuator assembly 18 to give an actual rear wheel 14 position measurement. The controller 22 references the numerous sensor inputs to determine how and when to initiate control of the rear axle 20 to steer the rear tires 14 of the vehicle 10.

In the present invention, the controller 22 will receive sensor inputs and information from sensors 32 that indicate the load and dynamics of a trailer hitch 34 and trailer 36 such that the controller 22 may compensate for oscillation created by the trailer 36.

Figure 2:
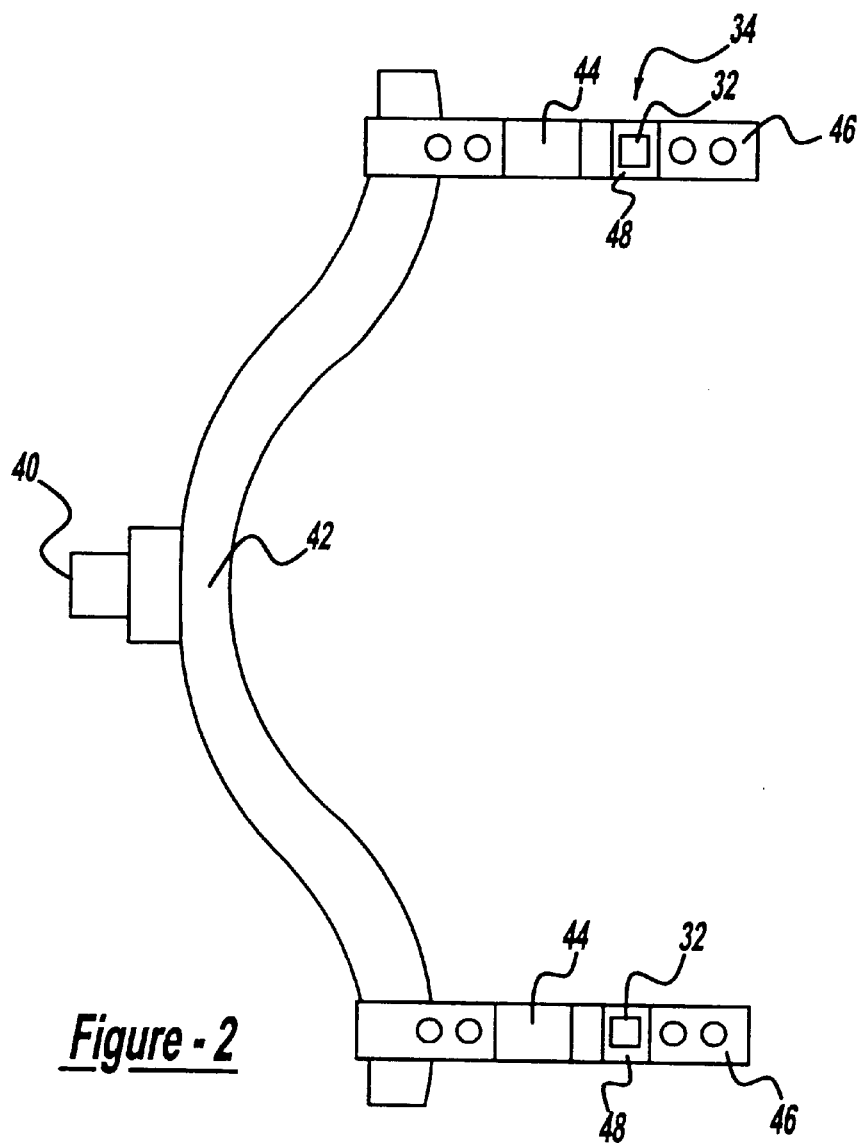
FIG. 2 is a diagrammatic drawing of a trailer hitch used in the present invention.
Figure 3:
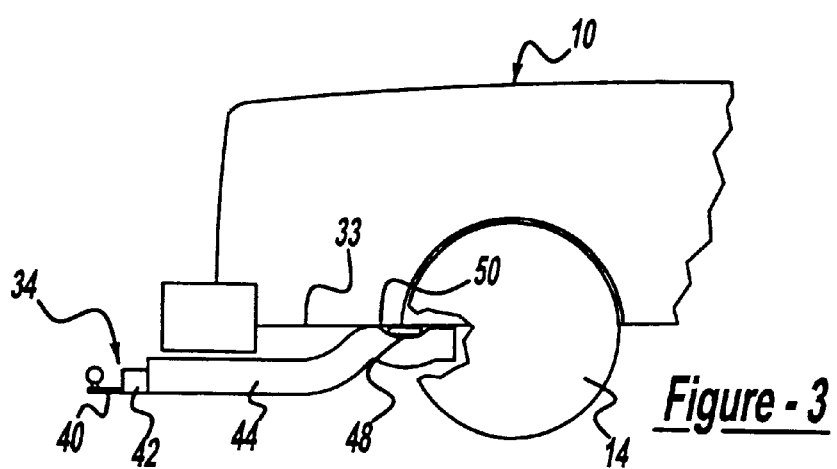
FIG. 3 is a partial side view of a trailer hitch used in the present invention.

Referring to FIGS. 1, 2 and 3, the trailer hitch 34 of the present invention is preferably conventionally coupled to the frame 33 of the vehicle 10. The trailer hitch includes a receiver tube 40, as is known in the art, coupled to a first member 42 and second members 44. The second members 44 include mounting points 46 to couple the trailer hitch 34 to the frame 33 of the vehicle 10.

Sensors 32 are preferably coupled to depressions 48 in members 44 between the frame 33 of the vehicle 10 and the members 44. The sensors 32 in the preferred embodiment are capacitive force sensors that detect the force or weight in the fore-aft (lateral) direction on both sides of the trailer hitch 34 and any oscillation or articulation of the trailer hitch 34. The sensors 32 may be elastomeric in structure and "poured" while in a liquid state into the frame depressions 48. An appropriate transducer may also be spring-loaded into the depressions 48 or mounted otherwise to the frame 33. While force sensors are use in the preferred embodiment, sensors that detect suspension travel, articulation and/or oscillation on the rear axle 20 such as linear potentiometers and encoders may also be used to detect instabilities in the vehicle driving dynamics and suspension caused by a towed trailer imbalance.

Figure 4:
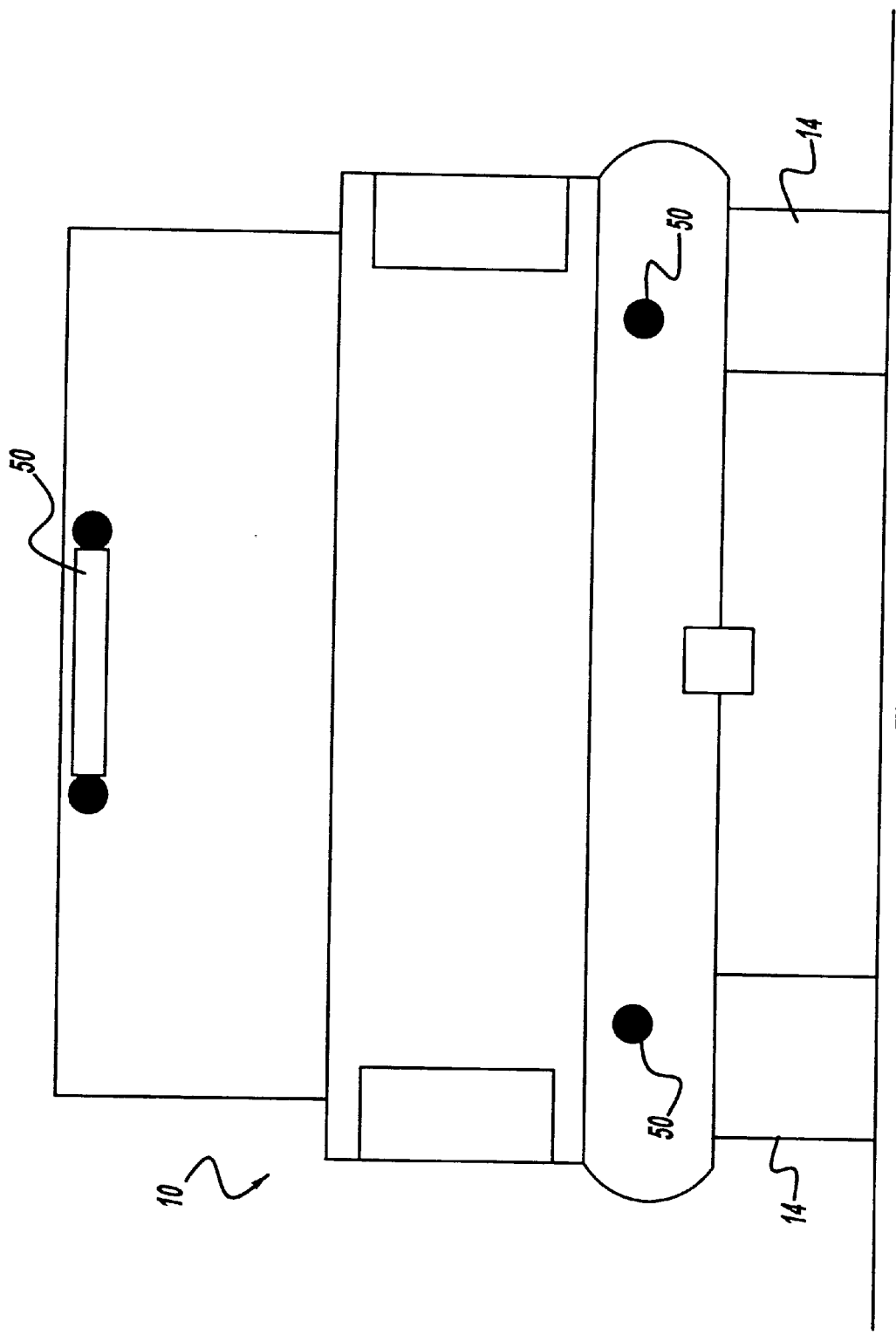
FIG. 4 is a diagrammatic drawing of the rear end of a vehicle including sensors to detect trailer oscillation or articulation.

FIG. 4 is a rear diagrammatic view of a vehicle equipped with alternate embodiments of the present invention. In a first alternate embodiment, trailer position and load sensing system 50 may include a vision system, Doppler radar system, infrared-based, laser-based, and/or ultrasonic system to determine the dynamics of the trailer 36 and vehicle 10. The system 50 may be mounted in the rear cab marker area utilizing the wire routing to the outside overhead brake light or on the rear bumper of the vehicle 10. If the system 50 is mounted on the rear bumper, it may utilize the trailer wiring bundle and output signals to an integrated vehicle control module such as a brake control module or steering control module.

Figure 5:
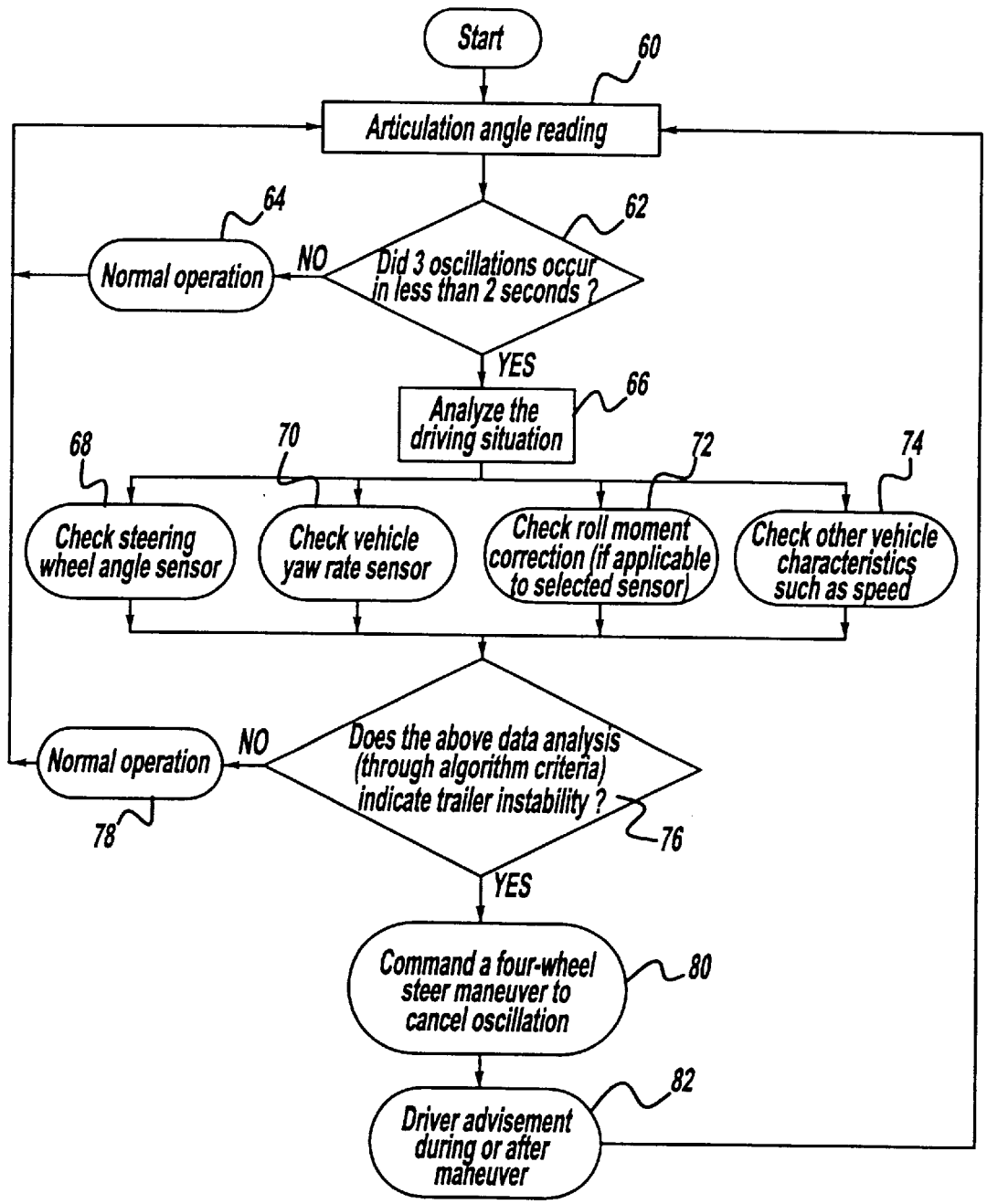
FIG. 5 is a flow chart of a compensation method of the present invention.

Referring to FIG. 5, the preferred method of the present invention is shown in flowchart form. Starting at block 60, while the vehicle 10 is in operation, an articulation, oscillation and/or vehicle instability sensor 32 reading or measurement is processed by the controller 22. The controller at block 62 determines if more than three oscillations occurred in less than two seconds. If three oscillations did not occur in less than two seconds, then the four-wheel steering system will continue with normal operation at block 64 and monitor the articulation angle readings at blocks 60 and 62. If three oscillations did occur in less than two seconds, then the driving situation will be analyzed at block 66 through blocks 68, 70, 72, and 74. Steering wheel angle, output from the yaw rate sensor 26, the roll moment correction generated by the sensors 32, vehicle speed and other vehicle parameters are monitored at blocks 68, 70, 72, and 74. At block 76 the monitored variable values generated at blocks 68, 70, 72, and 74 are processed to determine if they indicate trailer instability. Blocks 68, 70, 72, 74 are critical to the overall control algorithm to determine whether the detected oscillations require cancellation through four-wheel steering. If there is no trailer instability, the normal operation of the vehicle will continue at block 78. If there is trailer instability determined at block 76, then the chassis controller 22 will command the actuator assembly 18 to steer and cancel the instability or oscillations caused by the trailer 36. An indicator 90 will then be activated at block 82 to notify the operator of the vehicle 10 that there is an issue with the trailer 36 load and that the issue has been resolved or is being resolved through four-wheel steering.

While this invention has been described in terms of some specific embodiments, it will be appreciated that other forms can readily be adapted by one skilled in the art. Accordingly, the scope of this invention is to be considered limited only by the following claims.

What is claimed is:

1. A vehicle steering mechanism to compensate for instabilities comprising:

a vehicle frame;

a front axle coupled to said vehicle frame, said front axle further coupled to two front wheels;

a rear axle coupled to said vehicle frame, said rear axle further coupled to two rear wheels;

an actuator for changing a direction and angle of said two rear wheels;

a trailer hitch coupled to said frame;

at least one sensor for measuring instability in said trailer hitch;

a controller processing said measured instability; and wherein said controller controls said actuator and the direction and angle of said two rear wheels to compensate for said measured instability.

2. The vehicle steering mechanism of claim 1 wherein said vehicle frame is separate from the body of the vehicle.

3. The vehicle steering mechanism of claim 1 wherein said vehicle frame is incorporated in the body of the vehicle.

4. The vehicle steering mechanism of claim 1 wherein said rear axle is a solid rear axle.

5. The vehicle steering mechanism of claim 1 wherein said actuator is an electric motor.

6. The vehicle steering mechanism of claim 1 wherein said sensor is a strain gauge.

7. The vehicle steering mechanism of claim 1 wherein said sensor measures weight.

8. The vehicle steering mechanism of claim 1 wherein said sensor is a capacitive sensor.

9. A method of compensating for trailer instability for a vehicle and trailer tow configuration comprising determining if an instability in the vehicle and trailer tow configuration is present; and actuating a four-wheel steering system to compensate for a determined instability.

10. The method of claim 9 wherein the step of determining if an instability in the vehicle and trailer tow configuration comprises determining if an oscillation under driving conditions exists for the vehicle and trailer tow configuration.

11. The method of claim 9 wherein the step of determining if an instability in the vehicle and trailer tow configuration comprises measuring loads on a trailer hitch and processing the measured loads.

12. A trailer hitch for a vehicle comprising:

a first member coupled;

second members coupled to said first member in a substantially perpendicular configuration; and sensors coupled to said second members and in contact with the frame of the vehicle to sense vehicle loads.

13. The vehicle steering mechanism of claim 12 wherein said sensors are strain gauges.

14. The vehicle steering mechanism of claim 12 wherein said sensors measure weight.

15. The vehicle steering mechanism of claim 12 wherein said sensors are capacitive sensors.

* * * * *